United States Patent [19]

Dimitry

[11] 3,726,178
[45] Apr. 10, 1973

[54] MULTIPLE PURPOSE SEALING WASHER FOR THREADED AND CYLINDRICAL SHANKS

[75] Inventor: Edward A. Dimitry, Hillsdale, N.J.

[73] Assignee: APM Corporation, Englewood, N.J.

[22] Filed: June 25, 1971

[21] Appl. No.: 156,668

[52] U.S. Cl. .................... 85/1 JP, 277/166, 277/180
[51] Int. Cl. ............................................. F16b 43/00
[58] Field of Search ........................ 85/1 JP; 277/166, 277/180

[56] References Cited

UNITED STATES PATENTS

| 3,259,404 | 7/1966 | Papenguth | 277/180 |
| 2,795,444 | 6/1957 | Nenzell | 85/1 JP |
| 2,761,347 | 9/1956 | McKee | 85/1 JP |

FOREIGN PATENTS OR APPLICATIONS

| 836,197 | 6/1960 | Great Britain | 277/180 |
| 892,870 | 4/1962 | Great Britain | 85/1 JP |

Primary Examiner—Edward C. Allen
Attorney—Charles E. Temko

[57] ABSTRACT

A multiple purpose sealing washer for use in effecting a seal between a nut or fastener head and a parallel planar surface by selectively surrounding the threaded or unthreaded shank of said fastener. The device includes an outer, relatively rigid washer element, and an inner concentric elastomeric element having a relatively wide outer peripheral surface bonded to said rigid washer element at an inner peripheral surface thereof, and an inner periphery which is tapered to a sharp edge, corresponding to the interstice between two adjacent threads on said shank, whereby when said inner periphery engages a smooth cylindrical shank, said continuous edge forms a complete seal therebetween by radial expansion, and when said inner periphery is engaged with a threaded shank, the continuous threads thereon will deform said edge at one point on the periphery thereof to permit the other points on said edge to resiliently extend into the interstice between adjacent threads to prevent leakage along said interstice.

1 Claim, 4 Drawing Figures

PATENTED APR 10 1973 3,726,178

MULTIPLE PURPOSE SEALING WASHER FOR THREADED AND CYLINDRICAL SHANKS

This invention relates generally to the field of sealing washers of a type characterized in the provision of an outer relatively rigid washer member defining a central circular opening, and an elastomeric element bonded to said rigid washer element, the elastomeric element normally having a portion which is effectively thicker than the thickness of the rigid element, so that when the device is engaged upon a threaded shank of a fastening device, and the same tightened in position, the elastomeric portion will deform under pressure to provide a sealing function. Devices of this type are known in the art, and the invention lies in specific constructional details which permit the wider use of a single device in conjunction with both threaded and smooth shanks.

Most threaded sealing devices comprise an elongated shank which is at least partially threaded, and an enlarged head on one end thereof, the opposite end being engaged by a threaded nut so that the device can be tightened. When using fasteners having shanks which are only partially threaded along the length thereof, and the seal is placed beneath the head to engage the unthreaded portion of the shank, the effecting of a seal is a relatively simple matter. Where the hole through which the threaded fastener is inserted provides a relatively large clearance, and the shank is threaded throughout its entire length, or where the sealing washer is placed beneath the nut, rather than the head, it is common practice to provide a sealing washer which effects a seal directly against the crest of the thread. In the latter case, such a seal still permits leakage along the spiral interstice created by the threads, so that it is necessary to provide a sealing function within this channel.

In U.S. Pat. No. 3,259,404, there is disclosed a device of the instant type, in which there is provided a plurality of wedge-shaped protrusions on the inside of the cylindrical opening formed by the sealing element. These protrusions are in co-planar disposition, so that at least one of the protrusions will always be in a position to block the flow of a fluid through the interstice. While this construction is not without utility, it is not, at the same time, a construction suitable for use in engaging the unthreaded portion of a shank, where the shank has not been completely threaded. Thus, where sealing functions of both types are to be effected, two separate types of sealing washers are necessary.

It is therefore among the principal objects of the present invention to provide an improved sealing washer of the type disclosed, which is equally suitable for use in conjunction with completely threaded and partially threaded shanks forming parts of threaded fasteners.

Another object of the invention lies in the provision of an improved sealing washer construction possessed of the above advantage, which may be conveniently fabricated using existing techniques and materials at relatively low cost, thereby permitting consequent wide sale, distribution and use.

A further object of the invention lies in the provision of an improved seal washer of the type described which may be used in conjunction with bolts, screws or thread which otherwise incorporate no sealing provision.

A further object of the invention lies in the provision of an improved sealing washer in which a single size thereof may be used effectively with screws of a corresponding diameter of varying lead, and with both relatively course and relatively fine threads.

These objects, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

Figure 1:
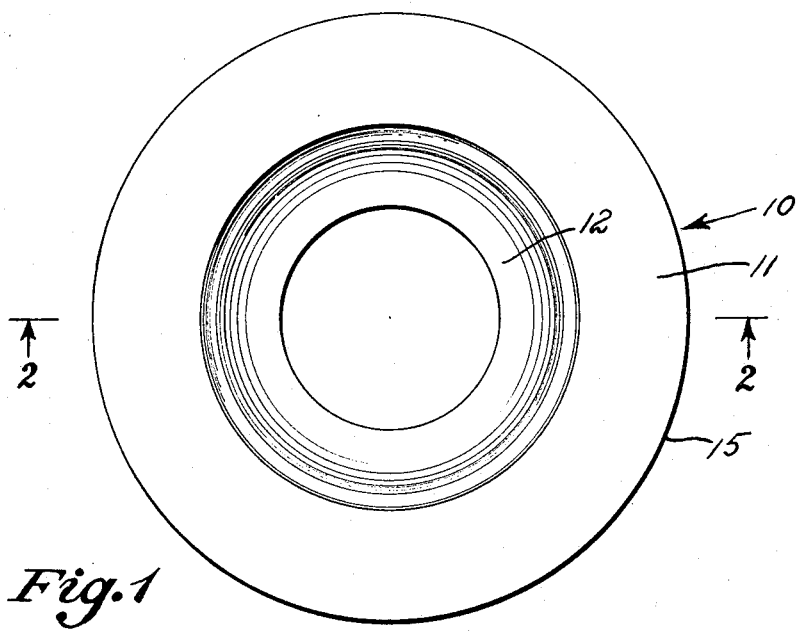
FIG. 1 is an end elevational view of an embodiment of the invention.

In accordance with the invention, the device, generally indicated by reference character 10, comprises broadly: an outer rigid washer element 11, and an inner elastomeric washer element 12.

The outer washer element 11 is of conventional hollow cylindrical configuration, and may be made of any suitable metal, depending upon intended purpose. It is of rectangular cross-section, and it is bounded by an outer peripheral surface 15, first and second side surfaces 16 and 17, respectively, and an inner peripheral surface 18.

Figure 2:
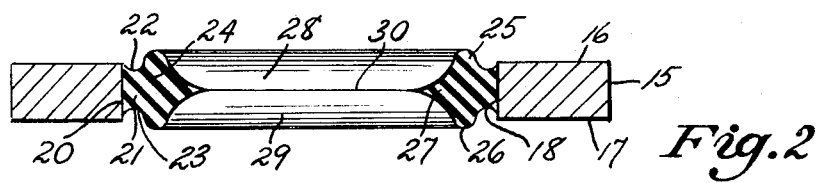
FIG. 2 is a central longitudinal sectional view thereof.

The inner washer element 12 may be of rubber, either natural or synthetic, or suitable elastomeric resin, again, depending upon intended purpose. It is of irregular cross-section, best seen in FIG. 2, and is bounded by an outer peripheral surface 20, suitably bonded, using known techniques to the inner peripheral surface 18 of the nut element 11. It includes a first annular portion 21 bounded by first and second concave surfaces 22 and 23. A second annular portion 24 is disposed radially inwardly thereof, and is bounded by convex surfaces 25 and 26. It will be observed that the first portion is normally of effective thickness less than that of the outer washer element 11, and the second portion is of effective thickness substantially greater than said thickness. Disposed inwardly of the second annular portion 24 is a third annular portion 27, of generally wedge-shaped configuration, and bounded by first and second concave surfaces 28 and 29 which meet in a curved relatively sharp edge 30 which defines the inner diameter of the opening 31 therein.

Figure 3:
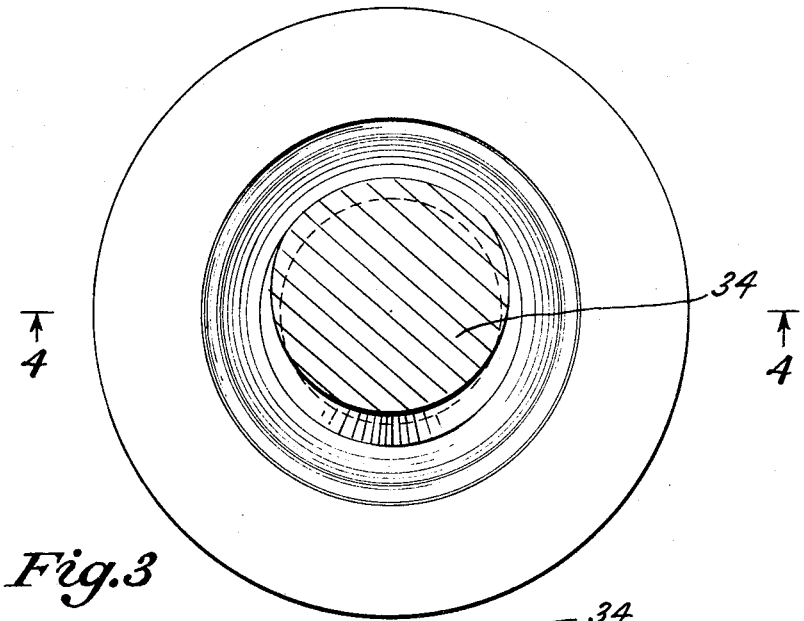
FIG. 3 is a central longitudinal sectional view thereof showing the same in installed condition.
Figure 4:
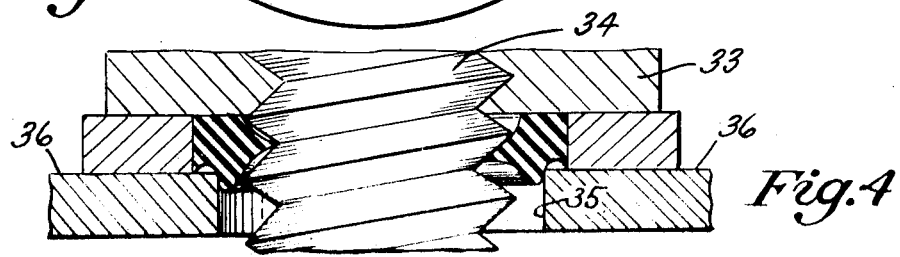
FIG. 4 is a transverse sectional view as seen from the plane 4—4 in FIG. 3.

Referring to FIG. 3 in the drawing, the device 10 is shown in installed condition in conjunction with a nut 33 and threaded shank portion 34, the shank penetrating an opening 35 in a planar surface 36. Owing to the existence of normal commercial tolerances, the clearance between the threads on the shank and those on the nut are normally sufficient to allow leakage of a fluid, and the only practical manner in which a seal can be effected therebetween is by directly engaging the crests of the threads, and providing a means which will penetrate the interstice between the threads to the full depth of the base circle in the area where the crests of the threads are engaged. A size washer is selected such that the diameter of the edge 30 corresponds to the base thread diameter of the shank 34, and upon engagement therewith, the thread will deform the edge much in the manner of a self-tapping fastener. The inner portions of the convex surfaces 25 and 26 will then be deformed to engage the adjacent crests of the threads, thereby completing the seal.

When it is desired to use the same device 10 in conjunction with an unthreaded portion of a shaft of the same outer diameter, the third annular portion 27 is stretched radially outwardly, and since the cross-section thereof is relatively thin, the expansion is readily absorbed by the filling in of the area axially outward of the concave surfaces 22 and 23.

I wish it to be understood that I do not consider the invention limited to the precise details of structure shown and set forth in this specification, for obvious modifications will occur to those skilled in the art to which the invention pertains.

I claim:

1. In combination, a fastener having a threaded shank, the threads of which have v-shaped flanks converging to a narrow root surface, and a multiple purpose sealing washer for effecting a seal between the head of the fastener and a parallel planar surface by surrounding a portion of said shank associated with said head; said washer including a relatively rigid outer washer element, and an inner concentric elastomeric annular element having a relatively rigid wide outer peripheral surface bonded to said rigid washer element, at least one concentric annular portion being of effective thickness greater than that of said rigid washer element spaced inwardly from said outer portion thereof, and having an inner peripheral annular portion of radially inwardly tapering cross section, formed by a pair of concave surfaces terminating in a single continuous annular sharp edge capable of entering into the spiral interstice created by the thread of the shank, said edge being thereby deformed at one point along said inner periphery by said thread upon engagement therewith; the unstressed diameter of said sharp edge corresponding to the root diameter of said threaded shank; said elastomeric element including a annular portion immediately adjacent said outer peripheral surface of effective thickness less than that of said rigid washer element to accommodate elastomeric flow in a radial direction upon compression of said elastomeric element.

* * * * *